United States Patent Office 3,408,365
Patented Oct. 29, 1968

3,408,365
2-ISOPRENOID SUBSTITUTED PHENOLS AND THE CORRESPONDING CHROMANS
Karl Folkers, Harold W. Moore, and Doyle Daves, Jr., Menlo Park, Calif., assignors, by mesne assignments, to Merck & Co., Inc., Rahway, N.J., a corporation of New Jersey
No Drawing. Filed May 17, 1965, Ser. No. 456,511
14 Claims. (Cl. 260—345.2)

ABSTRACT OF THE DISCLOSURE

Phenols substituted with an isoprenoid-type substituent at the 2- or 4-position, useful as intermediates in the preparation of chroman derivatives, the latter compounds exhibiting antioxidant activity.

Method: Phenol or a p-carbloweralkoxyphenol is reacted with a polyisoprenoid alcohol in the presence of an acidic condensing agent. The resulting isoprenoid substituted phenol may then be treated with an acidic cyclizing agent to form the chroman derivative.

---

This invention relates to novel chemical products and to novel methods and intermediates employed in the production thereof.

More particularly, it relates to phenols substituted with an isoprenoid-type substituent at the 2 or 4 position of the molecule. It further relates to derivatives of said 2-substituted phenols which contain a carboxyl function attached to the 4-position and to cyclic chroman derivatives of said 2- and/or 4-disubstituted-phenols.

In accordance with our invention, phenol or a p-carbalkoxyphenol is contacted with a polyisoprenoid alcohol in the presence of an acidic condensing agent to effect alkylation of the phenol in the o- or p- position and produce a 2- or 4-substituted phenol or a 2-substituted-4-carbalkoxyphenol. The 2-substituted phenols and the 2-substituted-4-carbalkoxyphenols produced in accordance with our invention are further treated by hydrogen chloride and cyclized to the corresponding cyclic chromans.

In accordance with a further embodiment of our invention, the 2-substituted-4-carbalkoxyphenols are converted to the corresponding 2-substituted phenols by first hydrolyzing the carbalkoxyphenol to the corresponding free acids, i.e., the 2-substituted-4-carboxyphenol, and then decarboxylating to the desired 2-substituted phenol by heating the carboxyphenol in intimate admixture with calcium oxide.

In carrying out the first step of the process for the preparation of the desired 2- or 4-substituted phenols, the starting materials selected are phenol or a p-hydroxybenzoic acid lower ester, i.e., a p-carbloweralkoxyphenol. The selected phenol or substituted phenol is then contacted with at least an equimolar of an isoprenoid alcohol having the formula

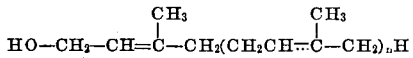

where $n$ is an integer of from 1 to 8, inclusive, and the dotted line indicates either an additional bond or two hydrogen atoms, in the presence of an acidic condensing agent to produce an isoprenoid substituted phenol or a p-carbloweralkoxy phenol of the formula

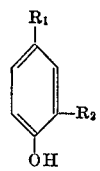

wherein $R_1$ is hydrogen, carbloweralkoxy or an isoprenoid radical and $R_2$ is either hydrogen or isoprenoid radical, $R_1$ and $R_2$ being selected so that either one or the other exists as an isoprenoid radical but only one of said substituents can be present as an isoprenoid radical.

In this step of our process, the phenol and the isoprenoid radical are brought into intimate contact in the presence of an acidic condensing agent such as borontrifluoride, zinc chloride, aluminum chloride, and the like, borontrifluoride being particularly preferred as a catalyst for carrying out this particular condensation reaction. The condensation step is preferably carried out in the presence of an inert liquid diluent for the reaction mixture although the presence of a diluent is not critical to the success of the invention. Diluent employed are preferably solvents for the reactant species in order to promote contact and increase the reaction rate. Solvents such as dioxane, ether, dimethoxyethane, as well as other ethers having intermediate boiling points, inert hydrocarbons and the like, are satisfactory reaction diluents.

The temperature at which the reaction is carried out is not critical. However, the condensation is preferably carried out in the liquid phase at temperatures between about 0 and 100° C., the lower temperatures being employed for the most reactant species such as the unsubstituted phenol, and slightly higher temperatures being preferred for the reaction of the substituted phenols, i.e., the p-carbalkoxyphenols.

In accordance with one embodiment of our invention, phenol is contacted with approximately an equimolar amount of an isoprenoid alcohol having from 2 to 9 isoprenoid units in the presence of borontrifluoride etherate at ambient temperatures, 25–30° C., for a period of about 1 to 2 hours, to produce a mixture of 2- and 4-substituted phenols which are separated by conventional means. A useful method for effecting the separation of the 2- and 4-isomers is the preparative gas chromatography. Thus, when phenol is reacted with geraniol, fornesol, solanesol or phytol in the presence of an acidic condensing agent, the materials produced, respectively, are mixtures of 2-geranylphenol and 4-geranylphenol, 2-farnesylphenol and 4-farnesylphenol, 2-solanesylphenol and 4-solanesylphenol and 2-phytylphenol and 4-phythylphenol. Each of these mixtures may be separated into the 2- and 4-isomers in the conventional manner as indicated hereinabove.

When the corresponding loweralkyl esters of p-hydroxybenzoic acid, i.e., p-carbloweralkoxyphenol, are subjected to the acidic condensation with an isoprenoid alcohol, the product of the reaction is a monoisoprenoid substituted carbalkoxyphenol wherein the isoprenoid substituent is attached to the 2-position. Thus, the condensation of p-carbalkoxyphenol with an isoprenoid alcohol produces under the same conditions as employed in the reaction of phenol itself, a 2-substituted-4-carbalkoxyphenol as the initial product.

The novel isoprenoid substituted phenols and carbalkoxyphenols are further treated in accordance with the process of our invention to effect cyclization to the corresponding chroman having the formula

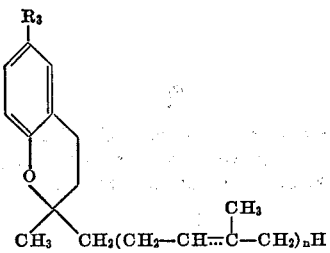

wherein $n$ is a positive integer from 1 to 8, inclusive and the dotted line represents either a carbon to carbon valence bond or two hydrogens and $R_3$ is either hydrogen or a carbloweralkoxy substituent.

The cyclization to the above-indicated chroman is conducted in the presence of an acidic cyclizing agent under energetic reaction conditions. It is preferred to carry out the reaction in an inert solvent at a temperature of from 0 up to the reflux temperature of the reaction mixture. The use of hydrogen chloride dissolved in alcohol is preferred, although other acidic reagents may be successfully employed. Thus, by treating the 2- and 4-monosubstituted-phenols and/or the corresponding 2-substituted-4-carbalkoxyphenols under acidic reaction conditions in an inert solvent, the compounds produced in accordance with our invention are the corresponding chromans of the above-indicated formula. The products produced in this manner can be purified by chromatography or by distillation.

The carbalkoxy isoprenoid substituted phenols produced in accordance with our invention, in addition to their inherent utility as biologically active materials may also be employed as intermediates in the preparation of the 2-isoprenoid substituted phenols in pure form uncontaminated by the corresponding 4-substituted compounds which are produced in mixture with the 2-isomers by the direct condensation of phenol and isoprenoid alcohol. Thus, in accordance with our invention, the carbalkoxy compounds, i.e., the p-carbalkoxy-2-isoprenoidphenols and the corresponding p-carbalkoxy chromans, are converted, respectively, to the 2-isoprenoid substitute phenols and the corresponding chroman compounds in accordance with the following reaction scheme.

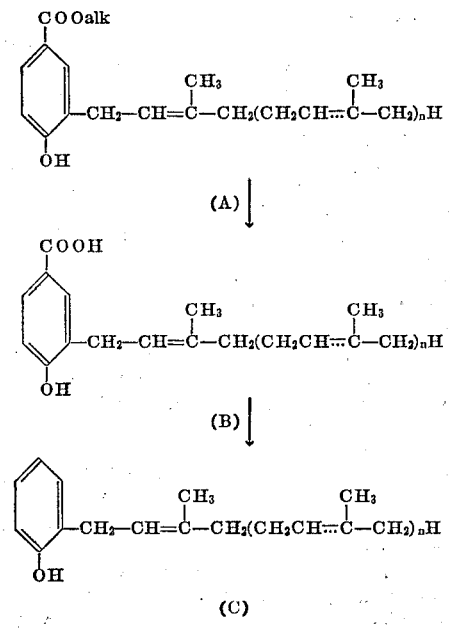

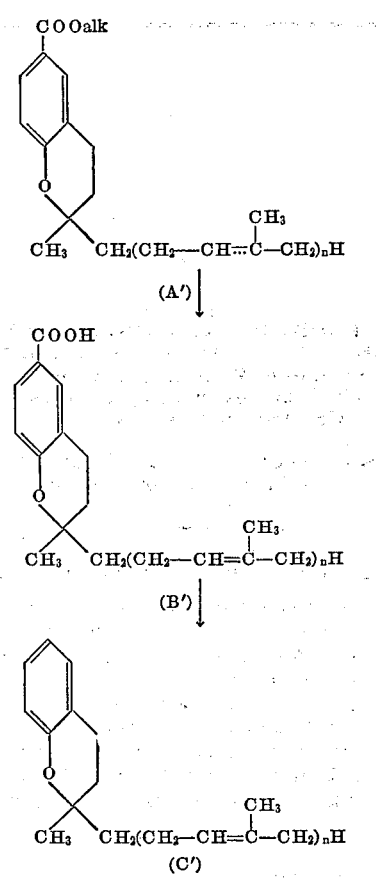

wherein alk stands for a loweralkyl substituent, $n$ is a positive integer from 1 to 8, inclusive, and the dotted line represents either a carbon to carbon valence bond or two hydrogens.

Thus, the carbalkoxy substituted phenol of the corresponding carbalkoxy chroman is hydrolyzed to the corresponding free acid by treatment with an aqueous or aqueous-alcohol solution of an alkali metal hydroxide. The resulting acid may be isolated by acidification of the hydrolysis solution and separated by filtration, or may be used directly in the next step of the reaction. The acid resulting from the hydrolysis of the ester is decarboxylated by heating in intimate admixture with an alkaline earth metal oxide, such as calcium oxide, to produce the desired compounds having the Formula C or C'.

The compounds of our invention are useful as antioxidants and, thus, can be employed in the preservation of foodstuffs, vitamin compositions, and the like.

EXAMPLE 1

2-isoprenoidsubstituted-4-carbalkoxyphenols

To a solution of 44.4 grams (0.15 mole) of phytol and 38 grams (0.25 mole) of methyl-p-hydroxybenzoate in 150 ml. of freshly distilled dioxane stirred at 50° is added dropwise 33 ml. of freshly distilled borontrifluoride etherate. After 12 hours, the reaction mixture is poured into 300 ml. of water and 600 ml. of ether. The organic layer is separated, washed with water, and dried. The solvent is removed and the residue comprising 2-phytyl-4-carbomethoxyphenol is triturated with hexane. The hexane-insoluble material (methyl-p-hydroxybenzoate) is removed. The residue from the hexane filtrate contains substantially pure product.

The corresponding 2-geranyl, 2-farnesyl and 2-solanesyl 4-carbomethoxyphenols are prepared by substituting in the above procedure 0.15 mole each, respectively, of geraniol, farnesol or solanesol in place of phytol.

EXAMPLE 2

2-isoprenoidsubstituted-4-carboxyphenols

The 2-phytyl-4-carbomethoxyphenol produced in accordance with the procedure of Example 1 is dissolved in 300 ml. of aqueous ethanol containing 15 grams of potassium hydroxide. The resulting solution is heated for 30 minutes at the reflux temperature of the reaction. The entire reaction mixture is then poured into 500 ml. of water and extracted with ether to remove undesired byproducts of the reaction. The aqueous layer is acidified with hydrochloric acid to pH 2 and again extracted with ether to obtain the product. The extract containing the desired product is evaporated under reduced pressure to produce a viscous oil comprising 2-phytyl-4-carboxyphenol. The oily product is purified by chromatography on a column containing 180 grams of silicic acid. The purified product is obtained as a colorless, viscous oil.

The procedure of the above example is repeated using equivalent amounts of 2-geranyl-4-carbomethoxyphenol, 2-farnesyl-4-carbomethoxyphenol and 2-solanesyl-4-carbomethoxyphenol to produce the corresponding free acids 2-geranyl-4-carboxyphenol, 2-farmnesyl-4-carboxyphenol and 2-solanesyl-4-carboxyphenol, which are isolated in the same manner as described above for the phytyl product.

The acids produced in accordance with the procedure of the example are converted to the corresponding alkali earth metal, i.e., lithium, potassium or sodium, or the alkaline earth metal, i.e., magnesium, calcium or barium, by titration of an aqueous alcoholic solution of the selected acid with the corresponding alkali or alkaline earth metal hydroxide and recovery of the salt by evaporation.

EXAMPLE 3

2-isoprenoidsubstitutedphenols

A mixture of 0.75 gram of 2-phytyl-4-carboxyphenol and 0.75 gram of calcium oxide is heated under reduced pressure (approximately 100 mm.) at 290° for approximately 2 hours until evolution of carbondioxide from the reaction mass ceases. The mixture is then cooled and extracted with methylene chloride to remove the 2-phytylphenol in solution. The methylene chloride solution of the product is then chromatographed on florisil using n-hexane as the eluent to yield substantially pure 2-phytylphenol as a colorless, viscous oil.

The corresponding acids, 2-geranyl-4-carboxyphenol, 2-farnesyl-4-carboxyphenol and 2-solanesyl-4-carboxyphenol are decarboxylated in the same manner as described for the corresponding phytyl compound to produce, respectively, 2-geranyl, 2-farnesyl and 2-solanesyl phenol.

EXAMPLE 4

(A) Preparation of 2 and 4-farnesylphenol

A solution of 10 grams (0.045 mole) of farnesol and 10 grams (0.16 mole) of phenol in 200 ml. of dioxane (freshly distilled from sodium) is cooled to 10° C. While the reaction mixture is maintained at this temperature, 7 ml. of freshly distilled borontrifluoride/etherate is slowly added (approximately 1.5 hours). After complete addition of the borontrifluoride/etherate, the reaction solution is allowed to warm to room temperature and is kept at this temperature for 18 hours. The reaction solution containing a mixture of 2-farnesylphenol and 4-farnesylphenol is then poured into three volumes of water and immediately extracted three times with n-hexane. The hexane extract is washed with distilled water, dilute sodium hydroxide, and again with water. The organic solution is then dried over sodium sulfate and concentrated in vacuo leaving a viscous light-yellow oil comprising the mixture of 2 and 4 isomeric products. The oil is chromatographed through a column of fluorisil using n-hexane followed by 10% ether in hexane as eluting solvents. The 10% ether/n-hexane eluate is concentrated in vacuo. A mixture of products, including the desired 2-farnesylphenol and 4-farnesyl phenol is present in the resulting oil as evidenced by thin layer and gas chromatography. The products are characterized from a small sample obtained from preparative gas chromatography at a temperature of 200° C. on silicon rubber columns (3 ft.). The injection port is maintained at a temperature of 200° C. and the flow rate (He) is set at 65 ml. per minute.

(B) Preparation of 2 and 4-geranylphenol

A solution of 10 grams of geraniol and 10 grams of phenol in 200 ml. of freshly distilled dioxane is cooled to 10° C. and 7 ml. of freshly distilled borontrifluoride/etherate is added over a period of 1.5 hours. The reaction solution is then warmed to room temperature and allowed to stand for 18 hours. The solution is then poured into water and immediately extracted three times with 200-ml. portions of n-hexane. The n-hexane extract containing a mixture of 2-generanylphenol and 4-geranylphenol is washed twice with water, dried and concentrated in vacuo. The resulting oil is chromatographed through a column of fluorisil using n-hexane followed by 10% ether/hexane as eluting solvents. The 10% ether/hexane eluate is concentrated in vacuo. This fraction contains the 2-geranylphenol as evidence by thin layer and gas chromatography. The 2-geranylphenol is isolated and purified by gas chromatography on silica rubber columns (3 ft.) at a temperature of 200° C. The injection port is maintained at a temperature of 300° and the He flow rate is kept at 65 ml. per minute. The spectral data, NMR, IR and UV, are in strict agreement with the proposed structure.

(C) Preparation of 2- and 4-phytylphenol

To a stirred solution of 19 grams (0.2 mole) of phenol and 15 grams (0.05 mole) of phytol in 150 ml. of freshly distilled dioxane is added dropwise 12 ml. of freshly distilled borontrifluoride etherate. After 3 hours the reaction mixture is poured into a mixture of 300 ml. of water and 200 ml. of ether. The ether layer is separated, washed with water, and dried. Removal of the solvent leaves an oily residue which is chromatographed on florisil using hexane as the eluent. A mixture of 2- and 4-phytylphenol is obtained. Analytical samples of the 2 isomers are obtained by preparative thin layer chromatography on silica gel G plates developed in a 1:1 benzene-chloroform solvent system. The NMR spectra of the isomers are characteristic for the structure assigned.

(D) Preparation of 2 and 4-solanesylphenol

From 2.1 grams of solanesol and 1.3 grams of phenol, by the procedure described in detail above, there is obtained a mixture of 2- and 4-solanesylphenol from which samples for characterization are obtained by preparative thin layer chromatography as described above.

Various changes and modifications of the invention can be made, and to the extent that such variations incorporate the spirit of this invention, they are intended to be included within the scope of the appended claims.

What is claimed is:

1. The process which comprises contacting a compound selected from the group consisting of phenol and a p-carbloweralkoxyphenol with a compound of the formula

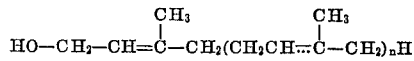

wherein $n$ is a positive integer from 1 to 8, inclusive, and the dotted line represents a member selected from the group consisting of a carbon to carbon valence bond and two hydrogens in the presence of an acidic condensing agent to form a 2,4-disubstituted phenol having the formula

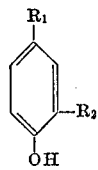

wherein $R_1$ is a member selected from the group consisting of hydrogen, carbloweralkoxy and an isoprenoid radical of the formula

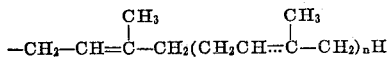

wherein $n$ is a positive integer of from 1 to 8, inclusive, and the dotted line represents a member selected from the group consisting of a carbon to carbon valence bond and two hydrogen atoms and $R_2$ is a member selected from the group consisting of hydrogen and an isoprenoid radical of the type described hereinabove, $R_1$ and $R_2$ being selected so that said 2,4-disubstituted phenol compound contains only one isoprenoid substituent.

2. The process which comprises contacting p-carbloweralkoxyphenol with a compound of the formula

to form a 2,4-disubstituted phenol ester of the formula

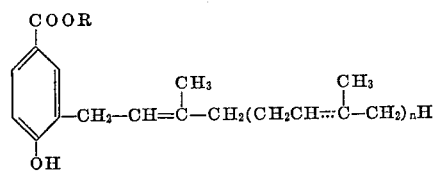

wherein R is a lower alkyl substituent, $n$ is a positive integer from 1 to 8, inclusive, and the dotted line represents a member selected from the group consisting of a carbon to carbon valence bond and two hydrogens, hydrolyzing said ester to the corresponding acid by contacting said ester with an aqueous solution of an alkali metal hydroxide and heating the resulting acid in the presence of calcium oxide to effect decarboxylation thereof and producing a compound of the formula

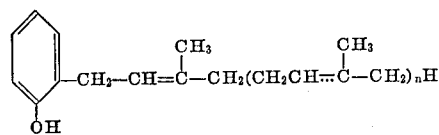

wherein $n$ is a positive integer from 1 to 8, inclusive, and the dotted line represents a member selected from the group consisting of a carbon to carbon valence bond and two hydrogens.

3. The process which comprises contacting a compound having the formula

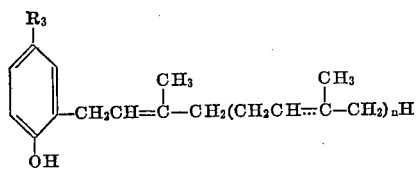

wherein $R_3$ is a member selected from the group consisting of hydrogen and a carbloweralkoxy substituent, $n$ is a positive integer from 1 to 8, inclusive, and the dotted line represents a member selected from the group consisting of a carbon to carbon valence bond and two hydrogens with alcoholic hydrogen chloride to produce a compound of the formula

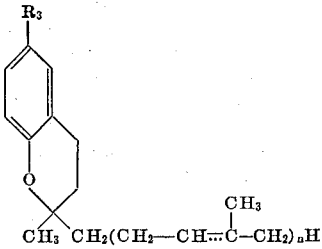

wherein $n$ is a positive integer from 1 to 8, inclusive, and the dotted line represents a member selected from the group consisting of a carbon to carbon valence bond and two hydrogens, and $R_3$ is as defined above.

4. A compound selected from the group consisting of p-carbloweralkoxyphenols of the formula

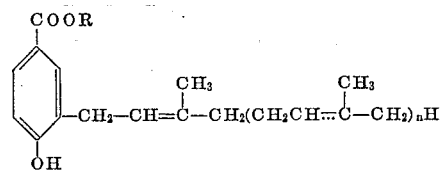

wherein R is a member selected from the group consisting of hydrogen and lower alkyl radicals, $n$ is a positive integer from 1 to 8, inclusive, and the dotted line represents a member selected from the group consisting of a carbon to carbon valence bond and two hydrogens.

5. A compound of the formula

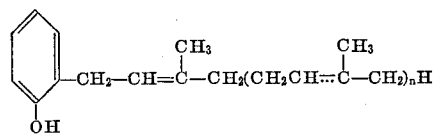

wherein $n$ is a positive integer from 1 to 8, inclusive, and the dotted line represents a member selected from the group consisting of a carbon to carbon valence bond and two hydrogen atoms.

6. A compound of the formula

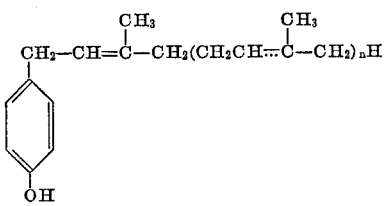

wherein $n$ is a positive integer from 1 to 8, inclusive, and the dotted line represents a member selected from the group consisting of a carbon to carbon valence bond and two hydrogen atoms.

7. A compound of the formula

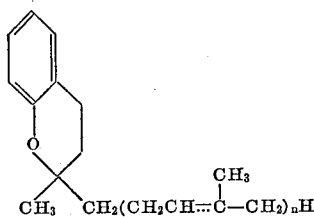

wherein $n$ is a positive integer from 1 to 8, inclusive, and the dotted line represents a member selected from the group consisting of a carbon to carbon valence bond and two hydrogens.

8. A compound of the formula

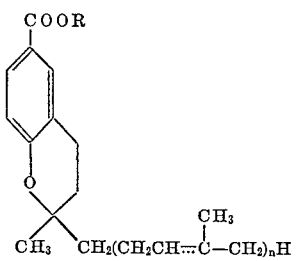

wherein R is a member selected from the group consisting of hydrogen and lower alkyl radicals, $n$ is a positive integer from 1 to 8, inclusive, and the dotted line represents a member selected from the group consisting of a carbon to carbon valence bond and two hydrogens.

9. 3-phytyl-4-hydroxymethylbenzoate.
10. 3-phytyl-4-hydroxybenzoic acid.
11. 2-phytylphenol.
12. 2-farnesylphenol.
13. 2-geranylphenol.
14. 2-solanesylphenol.

References Cited

UNITED STATES PATENTS

| | | | |
|---|---|---|---|
| 2,929,821 | 3/1960 | Hoeksema et al. | 260—521 |
| 3,004,040 | 10/1961 | Pendse et al. | 260—345.2 |
| 3,168,552 | 2/1965 | Hoeksema | 260—521 |

HENRY R. JILES, *Primary Examiner.*

WALTER A. MODANCE, J. M. FORD,

*Assistant Examiners.*